(12) United States Patent
Fukuda

(10) Patent No.: US 8,625,639 B2
(45) Date of Patent: Jan. 7, 2014

(54) INFORMATION PROCESSING APPARATUS AND SIGNAL TRANSMISSION METHOD

(75) Inventor: Kunio Fukuda, Tokyo (JP)

(73) Assignee: Sony Corporation, Tokyo (JP)

(*) Notice: Subject to any disclaimer, the term of this patent is extended or adjusted under 35 U.S.C. 154(b) by 560 days.

(21) Appl. No.: 12/551,927

(22) Filed: Sep. 1, 2009

(65) Prior Publication Data

US 2010/0085988 A1 Apr. 8, 2010

(30) Foreign Application Priority Data

Oct. 7, 2008 (JP) ................................. 2008-260254

(51) Int. Cl.
*H04J 1/00* (2006.01)
(52) U.S. Cl.
USPC ........ 370/480; 370/366; 455/575.1; 375/286; 375/337
(58) Field of Classification Search
USPC ......... 370/366, 480; 455/575.1, 575.3, 550.1; 345/102, 98; 375/286, 337; 341/98
See application file for complete search history.

(56) References Cited

U.S. PATENT DOCUMENTS

| | | | | |
|---|---|---|---|---|
| 4,264,972 | A * | 4/1981 | Drullmann et al. | 714/809 |
| 4,498,198 | A * | 2/1985 | Buzard et al. | 375/337 |
| 4,584,690 | A * | 4/1986 | Cafiero et al. | 375/290 |
| 7,657,676 | B2 * | 2/2010 | Kato et al. | 710/71 |
| 7,692,565 | B2 * | 4/2010 | Mohan et al. | 341/101 |
| 7,966,047 | B2 * | 6/2011 | Demuynck | 455/575.1 |
| 8,103,319 | B2 * | 1/2012 | Ikeda | 455/575.1 |
| 2003/0194017 | A1 * | 10/2003 | Woodworth | 375/286 |
| 2005/0162338 | A1 * | 7/2005 | Ikeda et al. | 345/2.1 |
| 2006/0103620 | A1 * | 5/2006 | Joo et al. | 345/98 |
| 2006/0121933 | A1 * | 6/2006 | Ikeda | 455/550.1 |
| 2006/0148541 | A1 * | 7/2006 | Vance | 455/575.3 |
| 2007/0002543 | A1 * | 1/2007 | Nord | 361/733 |
| 2008/0055231 | A1 * | 3/2008 | Nose et al. | 345/102 |
| 2008/0088492 | A1 * | 4/2008 | Wiley et al. | 341/98 |

FOREIGN PATENT DOCUMENTS

| | | | | |
|---|---|---|---|---|
| GB | 1563810 | * | 2/1976 | ............... H04L 5/06 |
| GB | 1563810 A | * | 2/1976 | ............... H04L 5/06 |
| JP | 58-12111 | | 1/1983 | |
| JP | 63-156435 | | 6/1988 | |
| JP | 3-109843 | | 5/1991 | |
| JP | 11-346182 | | 12/1999 | |
| JP | 2006-67555 | | 3/2006 | |
| JP | 2007-311082 | | 11/2007 | |

OTHER PUBLICATIONS

Office Action issued Aug. 24, 2010, in Japan Patent Application No. 2008-260254.

* cited by examiner

*Primary Examiner* — Michael Thier
*Assistant Examiner* — Vincelas Louis
(74) *Attorney, Agent, or Firm* — Oblon, Spivak, McClelland, Maier & Neustadt, L.L.P.

(57) ABSTRACT

An information processing apparatus is provided which includes a signal multiplexing unit for multiplexing a plurality of transmission signals, each in a different frequency band and not containing a DC component, and a power signal supplied from a DC power supply and generating a multiplexed signal, a single signal cable through which the multiplexed signal generated by the signal multiplexing unit is transmitted, and a signal separating unit for separating the multiplexed signal transmitted through the signal cable into signals, each in a frequency band of one of the plurality of transmission signals, and a signal in a frequency band of the power signal.

16 Claims, 10 Drawing Sheets

INFORMATION PROCESSING APPARATUS AND SIGNAL TRANSMISSION METHOD

BACKGROUND OF THE INVENTION

1. Field of the Invention

The present invention relates to an information processing apparatus and a signal transmission method.

2. Description of the Related Art

Most mobile terminals typified by mobile phones and the like use a movable member for a connecting portion between an operation portion to be used by a user and a display portion on which information is displayed. An opening and closing structure of a folding mobile phone is typical of such a movable member. Furthermore, in addition to a call function and an email function, recent mobile phones are provided with a viewing and listening function for a video, an imaging function and the like, thus requiring the above-described connecting portion to be able to be moved in complicated ways according to purposes of the user. For example, in a case of using the viewing and listening function for a video, the user would want to turn the display portion toward himself and stow away the operation portion which is unnecessary for viewing and listening. Thus a structure is desired which would enable the orientation or position of the display portion to be easily changed according to the purpose, such as when the mobile phone is used as an ordinary phone, when it is used as a digital camera, or when it is used as a television receiver.

However, a large number of signal lines and power lines pass through the connecting portion between the operation portion and the display portion. For example, several tens of wires are connected in parallel in the display portion. Therefore, when a movable member capable of complicated movement as described above is used for the connecting portion, the reliability and the like of the wiring will decrease significantly. For this reason, technology has been shifting from a parallel transmission scheme to a serial transmission scheme to reduce the number of signal lines in the connecting portion. Of course, technological shifts for similar reasons are not limited to the field of mobile phones, and are occurring in the fields of various electronic devices for which complicated wiring is required. Moreover, an additional reason for serialization may be to reduce electromagnetic interference (EMI).

In the serial transmission scheme described above, transmission data is transmitted after being encoded by a specific scheme. As the encoding scheme, for example, the non-return-to-zero (NRZ) encoding scheme, the Manchester encoding scheme, the alternate mark inversion (AMI) encoding scheme, or the like, may be used. For example, JP-A-1991-109843 discloses a technology for transmitting data by using an AMI code, which is a representative example of a bipolar code. The patent document also discloses a technology with which a data clock is transmitted after being expressed by an intermediate value of a signal level, and the receiving side regenerates the data clock based on the signal level.

SUMMARY OF THE INVENTION

Among the encoding schemes described above, a DC component is contained in a signal of the NRZ encoding scheme. Thus it is difficult to transmit the signal of the NRZ encoding scheme together with a DC component such as power supply. On the other hand, signals of the Manchester encoding scheme and the AMI encoding scheme do not contain a DC component. Thus the signals can be transmitted together with a DC component such as power supply. However, with the Manchester encoding scheme and the AMI encoding scheme, the receiving side has to have a phase-locked loop (PLL) circuit in order to regenerate the data clock of the signal. Thus, with a PLL circuit provided in the receiving side, the amount of current consumption will increase accordingly. Furthermore, with the Manchester encoding scheme, data is transmitted at a double data rate by using rise and fall of the clock amplitude. As a result, the amount of current consumption will increase due to the high clock operation.

In light of the foregoing, it is desirable to provide a novel and improved information processing apparatus and signal transmission method requiring no PLL circuit on the receiving side at the time of regenerating a clock, and capable of multiplexing a plurality of transmission signals with DC power and transmitting the same.

According to an embodiment of the present invention, there is provided an information processing apparatus including a signal multiplexing unit for multiplexing a plurality of transmission signals, each in a different frequency band and not containing a DC component, and a power signal supplied from a DC power supply and generating a multiplexed signal, a single signal cable through which the multiplexed signal generated by the signal multiplexing unit is transmitted, and a signal separating unit for separating the multiplexed signal transmitted through the signal cable into signals, each in a frequency band of one of the plurality of transmission signals, and a signal in a frequency band of the power signal.

Furthermore, the information processing apparatus may include first and second information processing modules connected to each other by the signal cable. In this case, the first information processing module has the DC power supply, the signal multiplexing unit, and a signal processing unit for performing a predetermined processing on the transmission signal, and the second information processing module has a display screen for outputting an image signal, a radio antenna, and the signal separating unit. Also, the signal multiplexing unit multiplexes, with the power signal, the image signal to be output on the display screen and a radio signal transmitted from the radio antenna as the transmission signals, and generates a multiplexed signal, and the signal separating unit separates the image signal, the radio signal and the power signal in the multiplexed signal.

Furthermore, the signal separating unit may include a first filter having a frequency band near a frequency 0 as a passband, and a plurality of second filters each having the frequency band of one of the plurality of transmission signals as a passband. In this case, the power signal is extracted from the multiplexed signal by the first filter. Also, each of the plurality of transmission signals is extracted from the multiplexed signal from which the power signal is removed, by each of the plurality of second filters.

Furthermore, the information processing apparatus may be a laptop personal computer or a mobile phone.

Furthermore, the signal multiplexing unit may be configured to multiplex, with the power signal, at least a transmission/reception signal in a wireless local area network (LAN) or a reception signal of a broadcast wave as the transmission signal.

Furthermore, the signal multiplexing unit may be configured to multiplex the plurality of transmission signals with the power signal, the plurality of transmission signals obtained by encoding input data that includes mutually different first and second bit values by expressing the first bit value in a form of a plurality of first amplitude values and the second bit value in a form of second amplitude values different from the first amplitude values such that a same amplitude value does not occur consecutively and a polarity of the amplitude value is inverted with each cycle.

According to another embodiment of the present invention, there is provided a signal transmission method including the steps of multiplexing a plurality of transmission signals, each in a different frequency band and not containing a DC component, and a power signal supplied from a DC power supply, and generating a multiplexed signal, transmitting the multiplexed signal generated in the step of multiplexing a plurality of transmission signals through a single signal cable, and separating the multiplexed signal transmitted through the signal cable into signals, each in a frequency band of one of the plurality of transmission signals, and a signal in a frequency band of the power signal.

According to the embodiments of the present invention described above, a PLL circuit is not required on the receiving side at the time of regenerating a clock, and a plurality of transmission signals can be transmitted being multiplexed with a DC power.

DETAILED DESCRIPTION OF THE INVENTION

Figure 1:
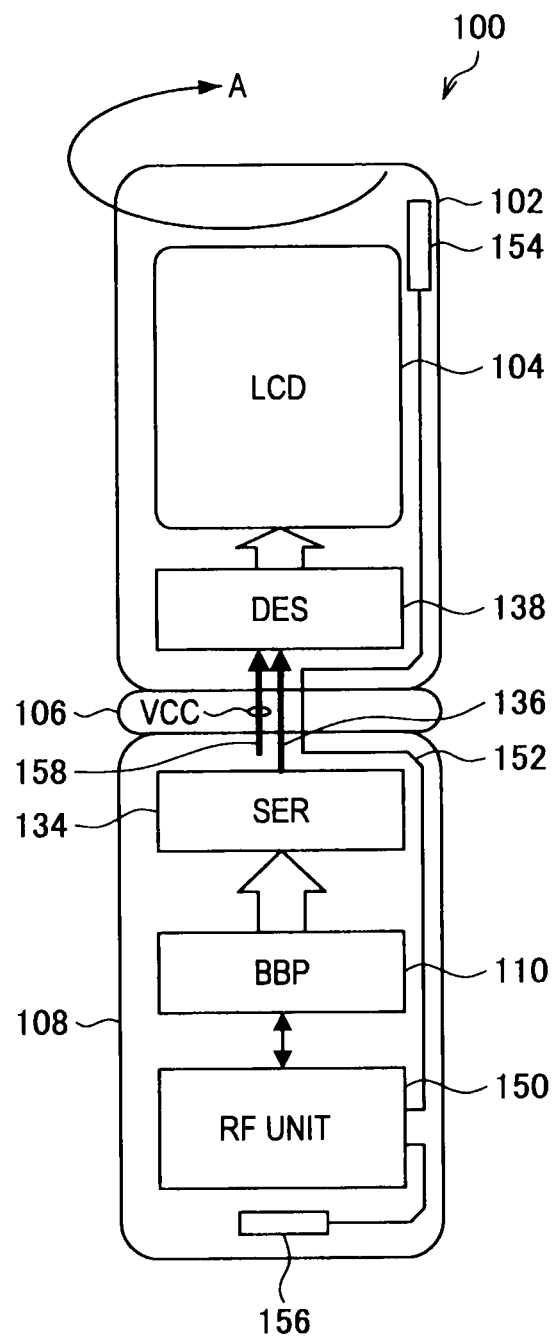
FIG. 1 is an explanatory diagram showing a configuration example of a mobile terminal adopting a serial transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present embodiment described below will briefly be mentioned. First, a configuration example of a mobile terminal or the like adopting a serial transmission scheme and a technological issue of the mobile terminal or the like of the serial transmission scheme will be described with reference to FIGS. 1 and 2.

Next, a configuration of a mobile terminal according to an embodiment of the present invention will be described with reference to FIGS. 3 and 4. Also, an encoding method according to the present embodiment will be described with reference to FIG. 5. Furthermore, frequency properties of an encoded signal obtained by the encoding method will be described with reference to FIG. 6. Then, a decoding method according to the present embodiment will be described with reference to FIG. 7. Next, a circuit configuration of a signal multiplexing/separating section according to the present embodiment will be described with reference to FIGS. 8 and 9. Then, an application example of the present embodiment will be described with reference to FIGS. 10 and 11. Lastly, the technical idea of the present embodiment will be summarized and operational effects obtained by the technical idea will be briefly described.

(Description Items)

1. Summary of Issues
2. Configuration of Mobile Terminal 200
3. Circuit Configuration of Signal Multiplexing/Separating Section
4. Application to PC
5. Conclusion 1. Summary of Issues First, before describing in detail the technology according to an embodiment of the present invention, issues to be solved by the present embodiment will be briefly summarized.

(Parallel Transmission Scheme)

As already described, with electronic devices such as a general mobile phone, a large number of signal lines and power lines pass through the connecting portion between the operation portion on which an arithmetic operation device is mounted and the display portion on which a display screen is mounted. For example, several tens of wires are connected in parallel in the display portion (parallel transmission scheme). Therefore, when a movable member capable of complicated movement is used for the connecting portion, the reliability of the wiring will decrease significantly. Also, if the reliability of the wiring is to be kept at a predetermined level or more, movement range of the connecting portion will be severely restricted. Thus a serial transmission scheme as shown in FIG. 1 has come to be adopted by the electronic devices such as a mobile phone. Furthermore, serialization of transmission lines is promoted with a view to reducing power consumption by reducing the number of signal lines driven at low impedance and with a view also to reducing electromagnetic interference (EMI).

(Serial Transmission Scheme)

A configuration example of a mobile terminal 100 adopting the serial transmission scheme will be briefly described with reference to FIG. 1. FIG. 1 is an explanatory diagram showing the configuration example of the mobile terminal 100 adopting the serial transmission scheme. Moreover, in FIG. 1, although a mobile phone is schematically illustrated as an example of the mobile terminal 100, the application scope of the technology described below is not limited to a mobile phone.

As shown in FIG. 1, the mobile terminal 100 mainly includes a display unit 102, a connecting unit 106, and an operation unit 108. Furthermore, the display unit 102 includes a liquid crystal unit 104 (liquid crystal display; LCD), a deserializer 138, and a first antenna 154. Also, the operation unit 108 includes a baseband processor 110 (BBP), a serializer 134, an RF unit 150, and a second antenna 156.

Also, a serial signal line 136, a radio signal line 152 and a power line 158 (VCC) pass through the connecting unit 106.

As described above, the liquid crystal unit 104 is provided on the display unit 102. An image signal transmitted through the serial signal line 136 is displayed on the liquid crystal unit 104. Moreover, a thin coaxial line is used for the serial signal line 136, for example. In this manner, the mobile terminal 100 transmits an image signal or the like (serial signal) through the serial signal line 136 passing through the connecting unit 106, based on the serial transmission scheme. The serializer 134 for serializing a parallel signal output from the baseband processor 110 is therefore provided in the operation unit 108. On the other hand, the deserializer 138 for parallelizing a serial signal transmitted through the serial signal line 136 is provided in the display unit 102.

The serializer 134 converts the parallel signal input from the baseband processor 110 to a serial signal. The serial signal output from the serializer 134 is input to the deserializer 138 through the serial signal line 136. The deserializer 138 restores the original parallel signal from the input serial signal, and inputs the restored signal to the liquid crystal unit 104. In the serial signal line 136, a data signal encoded by the NRZ encoding scheme is individually transmitted, or the data signal and a clock signal are transmitted together, for example. Moreover, a differential signal such as a low voltage differential signal (LVDS) is used, in many cases, for the serial signal that flows through the serial signal line 136.

Furthermore, the number k of lines in the serial signal line 136 can be reduced to only a few lines. Therefore, the movement range of the connecting unit 106 through which the serial signal line 136 passes is remarkably large. Furthermore, by serializing the transmission path, the reliability of the serial signal line 136 can be significantly improved. Thus, for example, a movable member allowing the display unit 102 to rotate 180 degrees in the direction of an arrow A in the drawing can be used for the connecting unit 106 connecting the display unit 102 and the operation unit 108. Furthermore, a movable member allowing the display unit 102 to tilt toward the operation unit 108 can be used for the connecting unit 106. By using such a movable member, a structure allowing the mobile terminal 100 to be folded with the display unit 102 turned toward a user can be realized.

As described above, serializing the transmission path of the image signal or the like to be transmitted from the baseband processor 110 to the liquid crystal unit 104 significantly reduces the number of signal lines passing through the connecting unit 106. However, in addition to the serial signal line 136, the radio signal line 152, the power line 158 and the like, for example, are wired in the mobile terminal 100.

The power line 158 is for supplying power to the display unit 102 from the operation unit 108. Normally, the battery of the mobile terminal 100 is mounted on the operation unit 108. Therefore, power is supplied from the operation unit 108 to the display unit 102. Furthermore, to reduce voltage drop, a wire rod having a certain degree of thickness or a plurality of thin wire rods bundled together is used for the power line 158. Thus, providing the power line 158 in addition to the serial signal line 136 will severely restrict the movement range of the connecting unit 106.

On the other hand, the radio signal line 152 is for transmitting a radio transmission signal (hereinafter also referred to as "radio signal" or "radio frequency signal") output from the RF unit 150 to the first antenna 154 provided in the display unit 102. Moreover, the RF unit 150 is a section for modulating an audio signal in communication, a data signal in data communication, or the like, to a radio transmission signal, and for outputting the signal. As shown in FIG. 1, two antennas (first antenna 154, second antenna 156) are provided in the mobile terminal 100 for diversity reception. The first antenna 154 is provided in the display unit 102, and is connected to the RF unit 150 via the radio signal line 152. On the other hand, the second antenna 156 is provided in the operation unit 108.

Normally, the operation unit 108 is a portion to be handheld by a user. Therefore, the sensitivity of the second antenna 156 provided in the operation unit 108 tends to decrease. Accordingly, the first antenna 154 is provided, as a main antenna, in the display unit 102 which is less likely to be handheld by the user. On the other hand, the second antenna 156 provided in the operation unit 108 is used as a sub antenna. However, since the first antenna 154 is provided in the display unit 102, the radio signal line 152 for connecting the first antenna 154 and the RF unit 150 passes through the connecting unit 106. As a result, providing the radio signal line 152 in addition to the serial signal line 136 and the power line 158 will severely restrict the movement range of the connecting unit 106.

As described above, even if the image signal or the like output from the baseband processor 110 is serialized, since the power line 158, the radio signal line 152 and the like are, in reality, provided, the movement range of the connecting unit 106 will be restricted. Furthermore, an audio input unit, an imaging unit and the like (not shown) may be mounted on the display unit 102, and a signal line for transmitting a signal from these structural elements to the baseband processor 110 may also be provided. Thus a technology for reducing the number of signal lines, such as the serial signal line 136, the power line 158 and the radio signal line 152, to a small number is desired for the mobile terminal 100 as described above.

(Functional Configuration)

Figure 2:
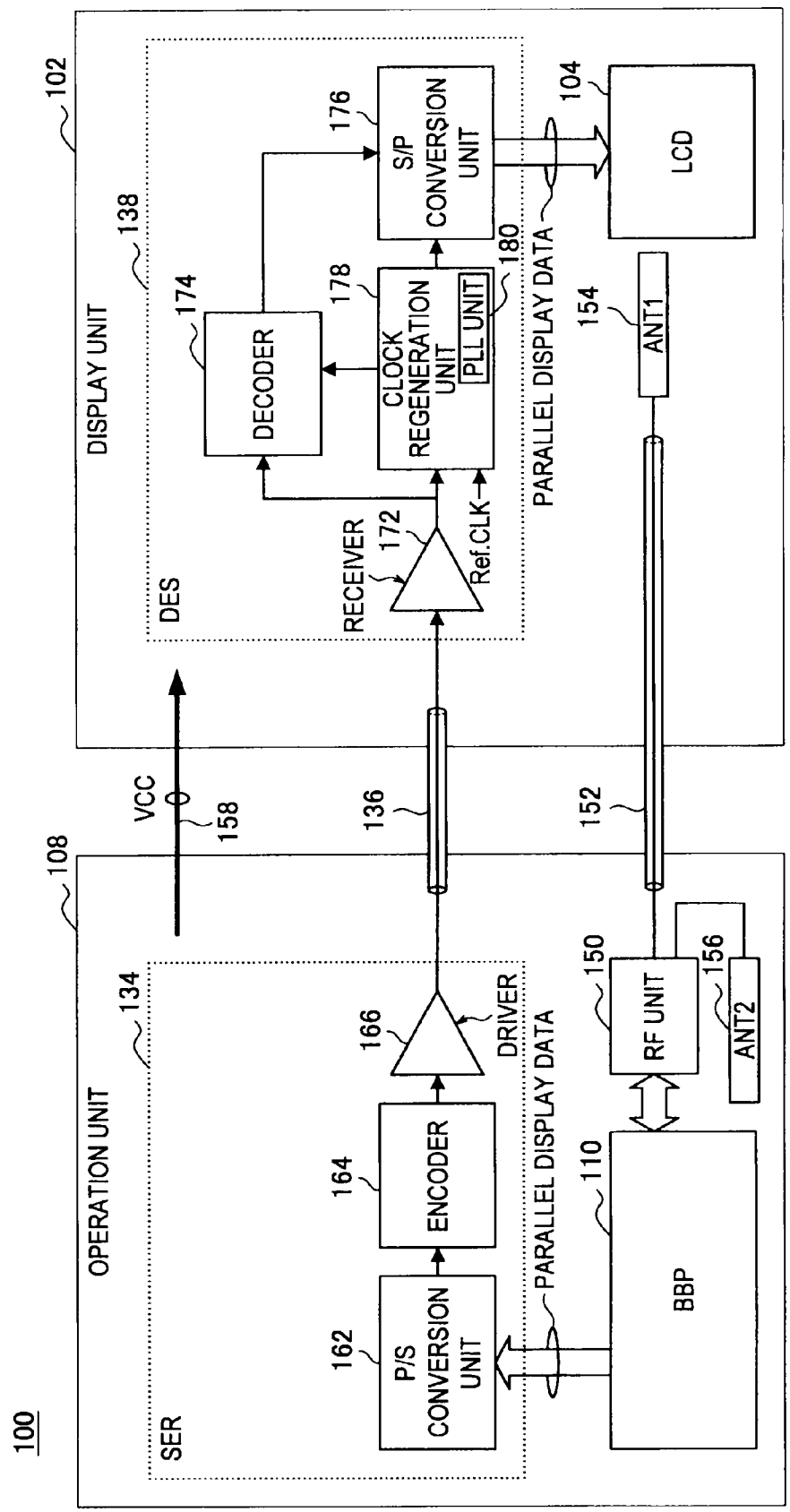
FIG. 2 is an explanatory diagram showing a configuration example of the mobile terminal adopting the serial transmission scheme.

Here, the functional configuration of the mobile terminal 100 adopting the serial transmission scheme will be described with reference to FIG. 2. However, detailed description of structural elements other than the serializer 134 and the deserializer 138 will be omitted, and description is made focusing on the functional configurations of the serializer 134 and the deserializer 138. FIG. 2 shows, for the mobile terminal 100 shown in FIG. 1, the functional configurations of the serializer 134 and the deserializer 138 in greater detail.

(Serializer 134)

As shown in FIG. 2, the serializer 134 is configured from a P/S conversion unit 162, an encoder 164, and a driver 166. A parallel signal (parallel display data) is input to the serializer 134 from the baseband processor 110. The parallel signal input to the serializer 134 is converted to a serial signal by the P/S conversion unit 162. The serial signal output from the P/S conversion unit 162 is input to the encoder 164. The encoder 164 adds a header and the like to the serial signal and inputs the same to the driver 166. The driver 166 transmits the input serial signal to the deserializer 138 according to LVDS.

(Deserializer 138)

The deserializer 138 is configured from a receiver 172, a decoder 174, an S/P conversion unit 176, a clock regeneration unit 178, and a PLL unit 180.

A serial signal is transmitted as a LVDS from the serializer 134 to the deserializer 138. The serial signal is received by the receiver 172. The serial signal received by the receiver 172 is input to the decoder 174 and the clock regeneration unit 178. The clock regeneration unit 178 refers to a reference clock (Ref. CLK) input from the outside, and regenerates a parallel signal clock from a serial signal clock by using a built-in PLL unit 180.

The parallel signal clock regenerated by the clock regeneration unit 178 is input to the decoder 174. The decoder 174 refers to the header of the serial signal that is input, detects the beginning portion of the data, and inputs the signal to the S/P conversion unit 176. At this time, the decoder 174 uses the parallel signal clock regenerated by the clock regeneration unit 178. The S/P conversion unit 176 converts the serial signal that is input to the parallel signal (parallel display data). The parallel signal that has been converted by the S/P conversion unit 176 is input to the liquid crystal unit 104 (LCD).

As described above, the parallel signal (parallel display data) input to the serializer 134 from the baseband processor 110 is converted to a serial signal and is transmitted to the deserializer 138. Then, the serial signal that is input is restored to the original parallel signal by the deserializer 138 and is input to the liquid crystal unit 104.

As with the mobile terminal 100 described above, the transmission path is serialized by converting the parallel signal to the serial signal and transmitting the serial signal. As a result, the movement range of the portion through which the serial signal line passes is enlarged, and the degree of freedom of the positioning of the display unit 102 is increased. Accordingly, for example, in a case where the mobile terminal 100 is used to view television broadcast or the like, the mobile terminal 100 can be transformed so that the display unit 102 is positioned in a landscape orientation from the user's point of view. The increase in the degree of freedom brings about a wider range of uses of the mobile terminal 100, and in addition to various functions of a communication terminal, a variety of uses becomes possible, such as viewing videos and listening to music.

However, since the power line 158, the radio signal line 152 and the like have to be provided separately from the serial signal line 136, the degree of freedom of the positioning of the display unit 102 is still restricted. For example, in a case a plurality of signal lines pass through the connecting unit 106, the display unit 102 cannot rotate 360 degrees in the direction of the arrow A shown in FIG. 1. Furthermore, since a PLL (PLL unit 180) is used when the deserializer 138 regenerates a clock, power consumption is increased. In view of the above, in the embodiment described below, a signal transmission method is proposed which can reduce the number of signal lines to pass through the connecting unit 106 to one, and also, which requires no PLL in the deserializer 138.

Embodiment

An embodiment of the present invention will be described. The present embodiment proposes the signal transmission method of transmitting a plurality of transmission signals to be transmitted from the operation unit 108 to the display unit 102 through a single signal line. The signal transmission method relates to a technology for superimposing the plurality of transmission signals on a DC power and transmitting the same, and furthermore, relates to a technology allowing the receiving side to regenerate a clock without using a PLL.

2. Configuration of Mobile Terminal 200

First, a device configuration example of a mobile terminal 200 according to the present embodiment will be described with reference to FIG. 3. FIG. 3 is an explanatory diagram showing the device configuration example of the mobile terminal 200 according to the present embodiment. However, structural elements that have substantially the same function as those of the mobile terminal 100 described above are denoted with the same reference numerals, and repeated explanation of these structural elements is omitted. Moreover, in FIG. 3, although a mobile phone is schematically illustrated as an example of the mobile terminal 200, the application scope of the technology described below is not limited to a mobile phone.

Figure 3:
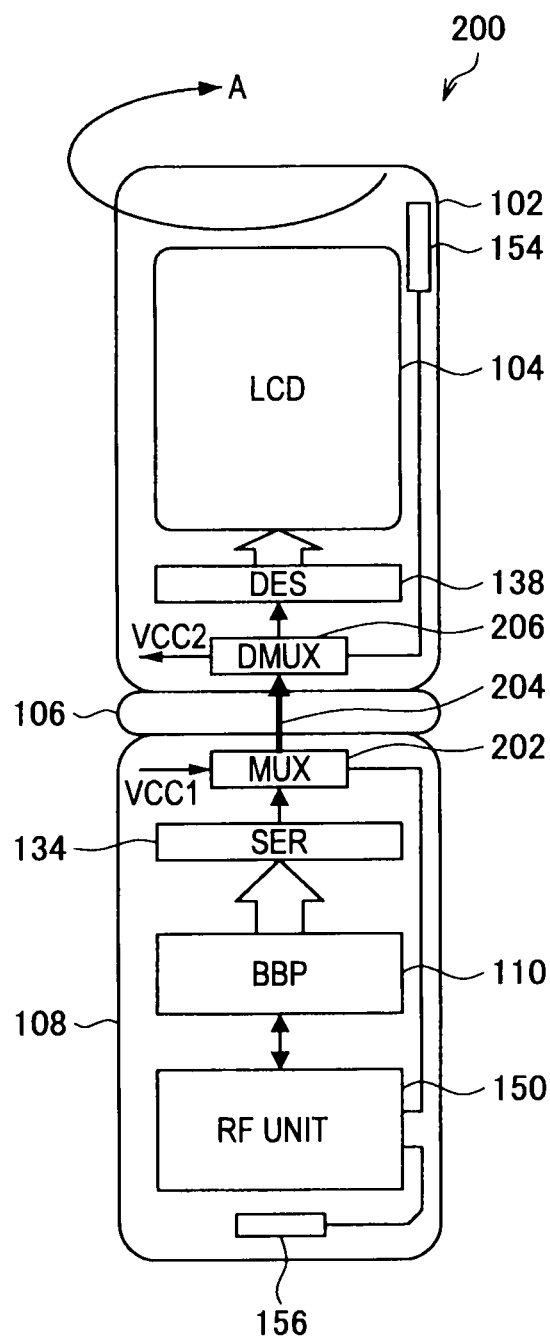
FIG. 3 is an explanatory diagram showing a configuration example of a mobile terminal according to an embodiment of the present invention.

As shown in FIG. 3, as with the mobile terminal 100 described above, the mobile terminal 200 includes the display unit 102, the connecting unit 106, and the operation unit 108. Furthermore, the display unit 102 includes the liquid crystal unit 104 (LCD), the deserializer 138, the first antenna 154, and a demultiplexer 206 (DMUX). Furthermore, the operation unit 108 includes the baseband processor 110 (BBP), the serializer 134, the RF unit 150, the second antenna 156, and a multiplexer 202 (MUX). One coaxial cable 204 passes through the connecting unit 106.

The main difference between the mobile terminal 100 described above and the mobile terminal 200 shown in FIG. 3 lies in the presence or absence of the multiplexer 202, the coaxial cable 204 and the demultiplexer 206. Thus these structural elements will be described in detail.

(Multiplexer 202)

As shown in FIG. 3, a serial signal such as an image signal is input from the serializer 134 to the multiplexer 202, and a radio transmission signal such as a data signal or an audio signal is input from the RF unit 150 to the multiplexer 202. Furthermore, a power signal (VCC1) from a DC power supply is input to the multiplexer 202. As already described, the serial signal described above is a signal obtained by serializing the parallel signal that is output from the baseband processor 110 by the serializer 134. When these signals are input, the multiplexer 202 multiplexes, with the power signal, the serial signal and the radio transmission signal that are input and generates a multiplexed signal, and transmits the multiplexed signal to the demultiplexer 206 of the display unit 102 through the coaxial cable 204.

(Demultiplexer 206)

When the multiplexed signal is transmitted through the coaxial cable 204, the demultiplexer 206 separates the power signal (VCC2), the serial signal and the radio transmission signal in the received multiplexed signal. At this time, the demultiplexer 206 separates each of the signals by selectively extracting, from the multiplexed signal, a signal in a frequency band of each of the power signal, serial signal and radio transmission signal. For example, the power signal is contained in the multiplexed signal as a DC component. Thus the demultiplexer 206 can extract the power signal by cutting out the frequency band near a frequency 0 from the multiplexed signal.

Furthermore, the radio transmission signal is extracted by cutting out a radio frequency (RF) band from the multiplexed signal. Furthermore, the serial signal is extracted by cutting out the frequency band lower than that of the radio transmission signal. That is, signal components are separated in the frequency domain. Among the signals separated by the demultiplexer 206, the power signal is supplied to each of the structural elements of the display unit 102 as a driving power. Furthermore, the radio transmission signal is transmitted to the first antenna 154 and is wirelessly sent out. Furthermore, the serial signal is input to the deserializer 138. The deserializer 138 restores the input serial signal to the original parallel signal and inputs the parallel signal to the liquid crystal unit 104.

Heretofore, the device configuration of the mobile terminal 200 has been described. As described above, by multiplexing the serial signal, such as an image signal, and the radio transmission signal with the power signal and transmitting the same, all the signals can be transmitted using the one coaxial cable 204. That is, only one coaxial cable 204 passes through the connecting unit 106. Thus the movement range of the connecting unit 106 can be considerably increased, and at the same time, the reliability of the signal line can be significantly improved. Since only one signal line passes through the connecting unit 106, a configuration can be achieved where a rotation of 360 degrees in the direction of an arrow A shown in FIG. 3 is enabled, for example.

(Functional Configuration)

Here, a functional configuration of the mobile terminal 200 adopting the serial transmission scheme will be described with reference to FIG. 4. However, detailed description of structural elements other than the serializer 134 and the deserializer 138 will be omitted, and description will be made focusing on the functional configurations of the serializer 134 and the deserializer 138. FIG. 4 shows for the mobile terminal 200 shown in FIG. 3, the functional configurations of the serializer 134 and the deserializer 138 in greater detail. Furthermore, the relationship between the serializer 134, the RF unit 150, and the multiplexer 202, and the relationship between the deserializer 138 and the demultiplexer 206 are clearly indicated.

(Functional Configuration of Operation Unit 108)

Figure 4:
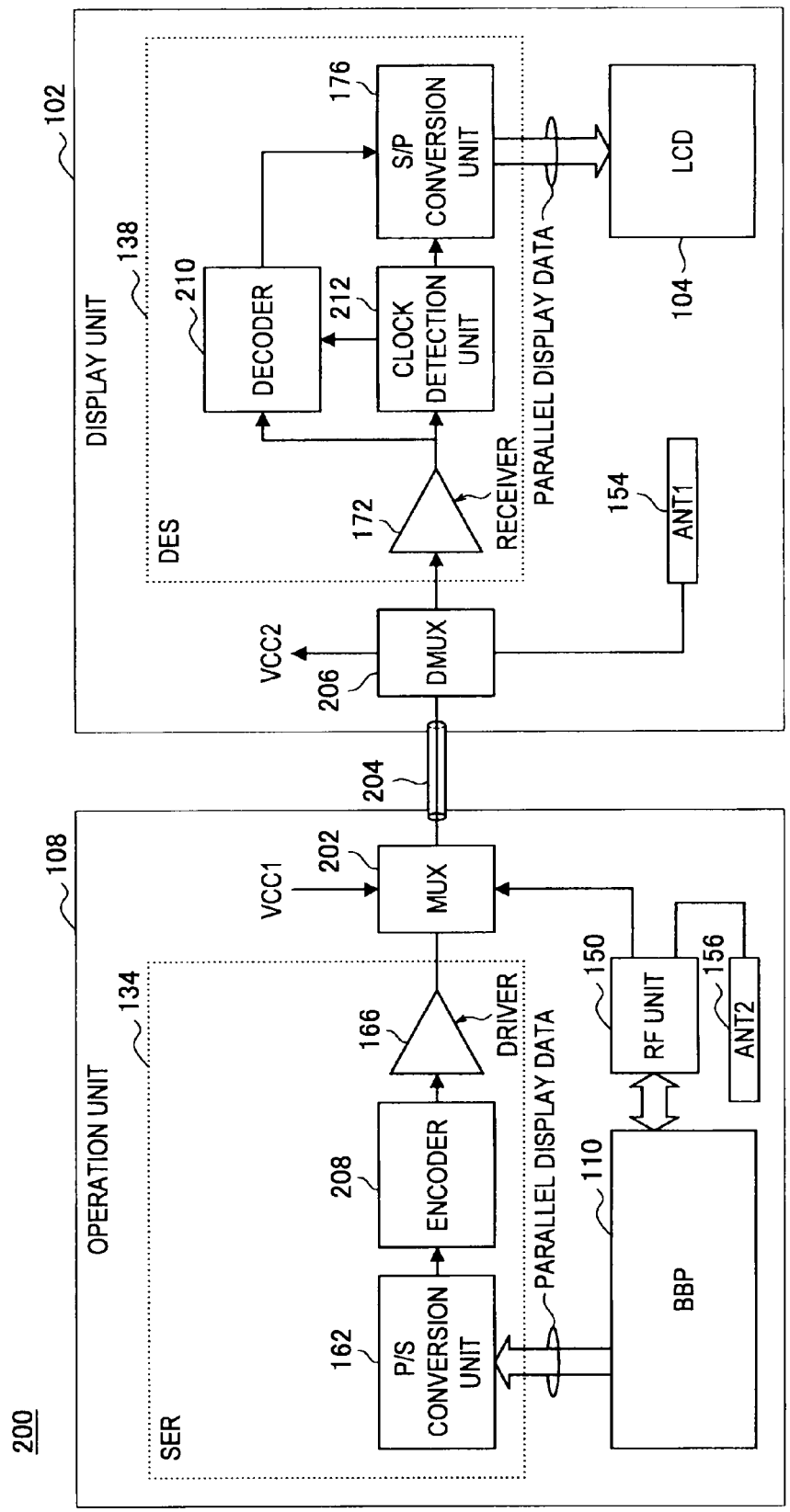
FIG. 4 is an explanatory diagram showing a configuration example of the mobile terminal according to the present embodiment.

As shown in FIG. 4, the serializer 134 is configured from the P/S conversion unit 162, an encoder 208, and the driver 166. A parallel signal (parallel display data) is input from the baseband processor 110 to the serializer 134. The parallel signal input to the serializer 134 is converted to a serial signal by the P/S conversion unit 162. The serial signal output from the P/S conversion unit 162 is input to the encoder 208. The encoder 208 generates an encoded signal by adding a header and the like to the serial signal and encoding the serial signal according to a predetermined encoding scheme.

Figure 5:
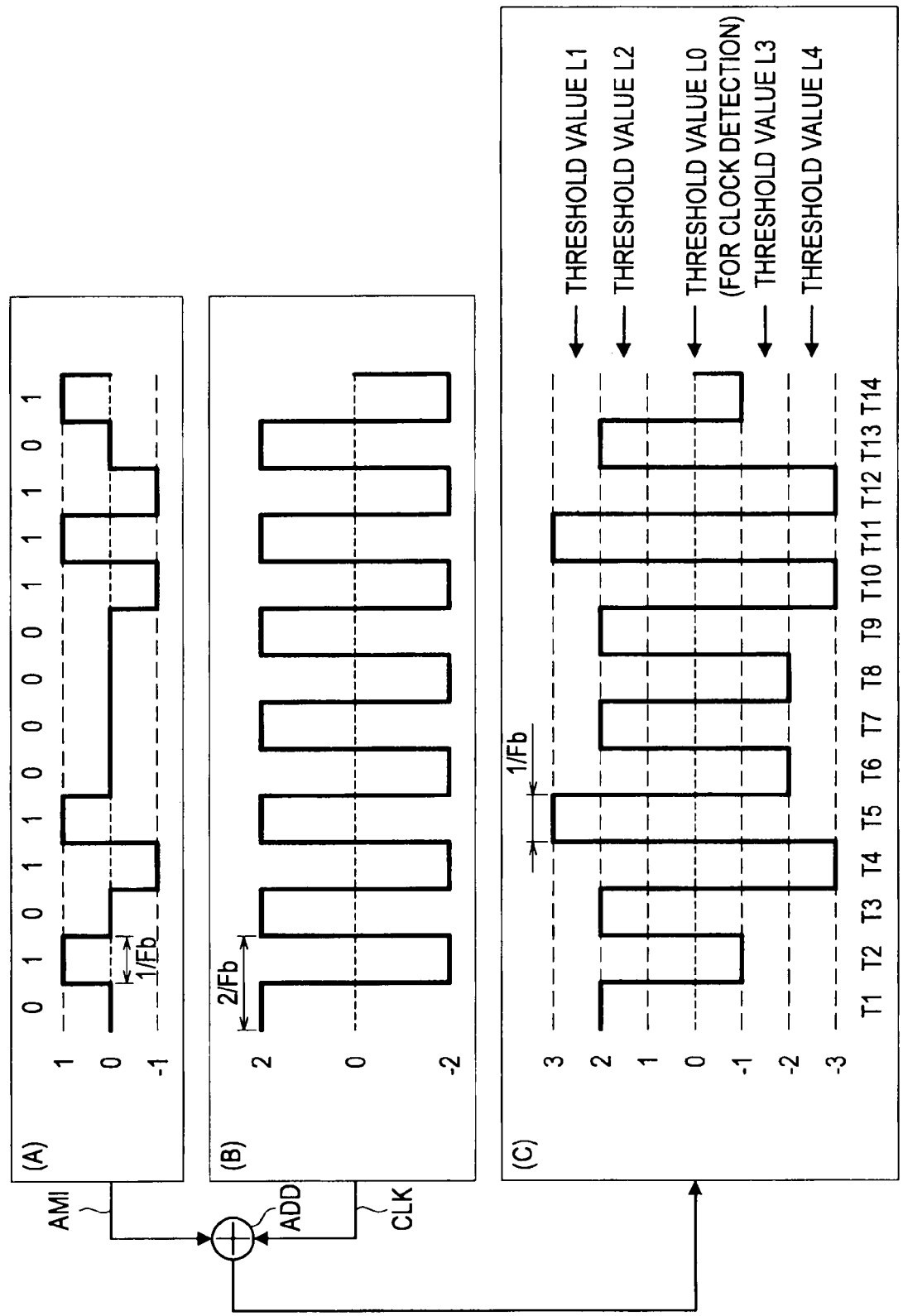
FIG. 5 is an explanatory diagram showing an example of an encoding method according to the present embodiment.

Here, an encoding method of the encoder 208 will be described with reference to FIG. 5. FIG. 5 is an explanatory diagram showing an example of the encoding method according to the present embodiment. Moreover, FIG. 5 illustrates a method of generating a code for which an AMI code with a duty of 100% serves as a base. However, the technology according to the present embodiment is not limited to such, and is applied to any code having the same properties as the AMI code in the same manner. For example, it can be applied to a bipolar code, a code according to a partial response scheme, and the like.

(Signal Configuration)

First, the configuration of a signal generated by an encoding process of the encoder 208 will be described. A signal (A) shown in FIG. 5 is input data that has been encoded based on the AMI encoding scheme. On the other hand, a signal (C) is the signal (A) that has been encoded based on the encoding method according to the present embodiment. In the signal (C), data values 1 are expressed by a plurality of potentials A1 (−1, −3, 1, 3), and data values 0 are expressed by a plurality of potentials A2 (−2, 2) that are different from the potentials A1. Furthermore, the polarities are inverted with each cycle for the signal (C), and the same potential does not occur consecutively. Thus clock components can be regenerated based on the rising edges and the falling edges of the signal (C).

For example, referring to the signal (A), there is a period in bit intervals T6 to T9 during which the data values 0 occur consecutively. That is, the signal (A) contains a period during which potentials 0 occur consecutively. When there is a period during which the same potentials occur consecutively as described above, the cycle of the rising and falling becomes hard to detect, making it difficult to regenerate a clock from the signal. However, the signal (C) does not contain a period during which the same potentials occur consecutively. For example, in the signal (C), even in the bit intervals T6 to T9 where the same data values occur consecutively, the data values will be expressed by mutually different potentials (−2, 2). In this manner, the signal (C) is configured such that the polarities are inverted with each cycle even if the same data values occur consecutively.

(Encoding Method)

Next, a method of the encoder 208 for generating the signal (C) will be described. First, the encoder 208 encodes an input serial signal to the AMI code signal (A). Then, the encoder 208 generates a clock signal (B) having a frequency (Fb/2) half that of the AMI code having a transmission rate Fb. That is, a cycle of the clock signal is 2/Fb. However, the amplitude of the clock signal is N times (N>1; for example, N=2) that of the AMI code. Then, the encoder 208 inputs the signal (A) and the clock signal (B) to an adder ADD to add the signals, and generates the signal (C). At this time, the AMI code and the clock are synchronized, and are added with the edges aligned.

Figure 6:
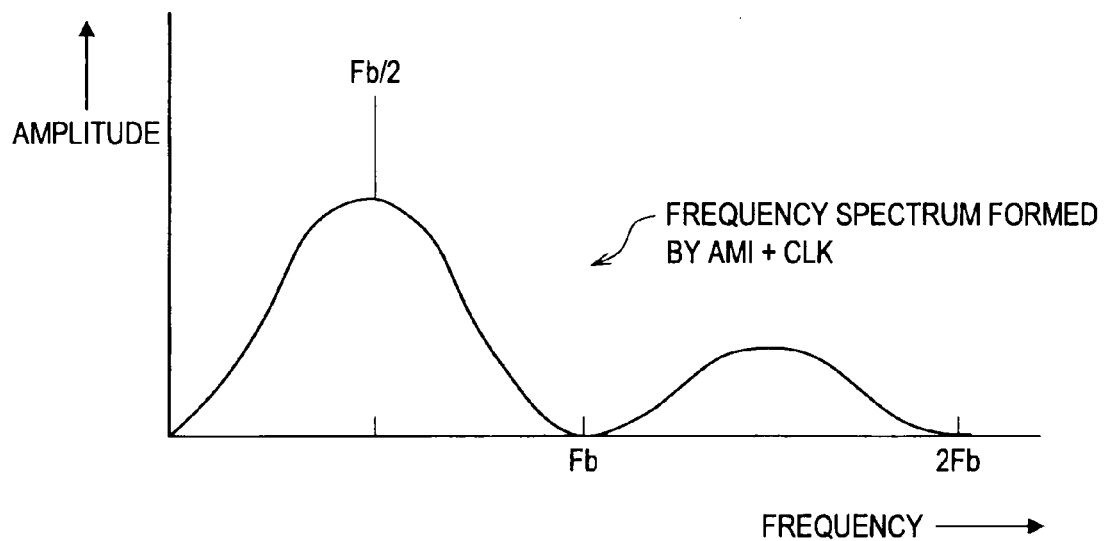
FIG. 6 is an explanatory diagram showing a frequency spectrum of a signal according to the present embodiment.

Heretofore, the encoding method of the encoder 208 has been described. The frequency spectrum of a signal, such as the signal (C), that does not contain a DC component and whose polarities are inverted with each cycle, has a form as shown in FIG. 6. A line spectrum appears in the frequency Fb/2 of the clock signal that is added by the adder ADD, and in addition, a broad frequency spectrum of the AMI code is also present. Furthermore, in this frequency spectrum, null points exist at the frequencies Fb, 2Fb, . . . .

Reference will be made again to FIG. 4. The signal (C) (hereinafter, "serial signal") generated by the encoder 208 in the manner described above is input to the multiplexer 202 via the driver 166. Furthermore, a radio frequency signal (hereinafter, "radio transmission signal") output from the RF unit 150 and the power signal (VCC1) input from the DC power supply are also input to the multiplexer 202. The multiplexer 202 multiplexes the serial signal and the radio transmission signal with the power signal, and generates a multiplexed signal. The multiplexed signal generated by the multiplexer 202 is transmitted to the demultiplexer 206 of the display unit 102 through the coaxial cable 204.

(Functional Configuration of Display Unit 102)

When the multiplexed signal is transmitted through the coaxial cable 204, the demultiplexer 206 separates the power signal (VCC2), the serial signal and the radio transmission signal that are contained in the multiplexed signal. The power signal (VCC2) separated by the demultiplexer 206 is supplied to each of the structural elements of the display unit 102 as a driving power. Also, the radio transmission signal is transmitted to the first antenna 154. Furthermore, the serial signal is input to the receiver 172 of the deserializer 138. A detailed circuit configuration of the demultiplexer 206 will be described later.

Here, the functional configuration of the deserializer 138 will be described. As shown in FIG. 4, the deserializer 138 is configured mainly from the receiver 172, the S/P conversion unit 176, a decoder 210, and a clock detection unit 212. Moreover, the main difference between this deserializer 138 and the deserializer 138 mounted on the mobile terminal 100 described above lies in the functional configuration of the clock detection unit 212 that does not have the PLL.

As described above, the serial signal is input to the deserializer 138 from the demultiplexer 206. The serial signal is received by the receiver 172. The serial signal received by the receiver 172 is input to the decoder 210 and the clock detection unit 212. The decoder 210 refers to the header of the input serial signal, detects the beginning portion of the data, and restores the original serial signal according to the encoding scheme used by the encoder 208. At this time, the decoder 210 uses the clock regenerated by the clock detection unit 212.

Here, a decoding method of the decoder 210 will be briefly described with reference to FIG. 5. As described above, the serial signal is a signal that has been encoded by the encoder 208 to the signal (C). Thus the decoder 210 restores the original signal by determining whether the amplitude of the signal received by the receiver 172 is A1 or A2. For example, four threshold values (L1, L2, L3, L4) shown in FIG. 5 are used to determine whether the amplitude is the amplitude A1 (−1, −3, 1, 3) corresponding to a data value 1, or the amplitude A2 (−2, 2) corresponding to a data value 0.

Figure 7:
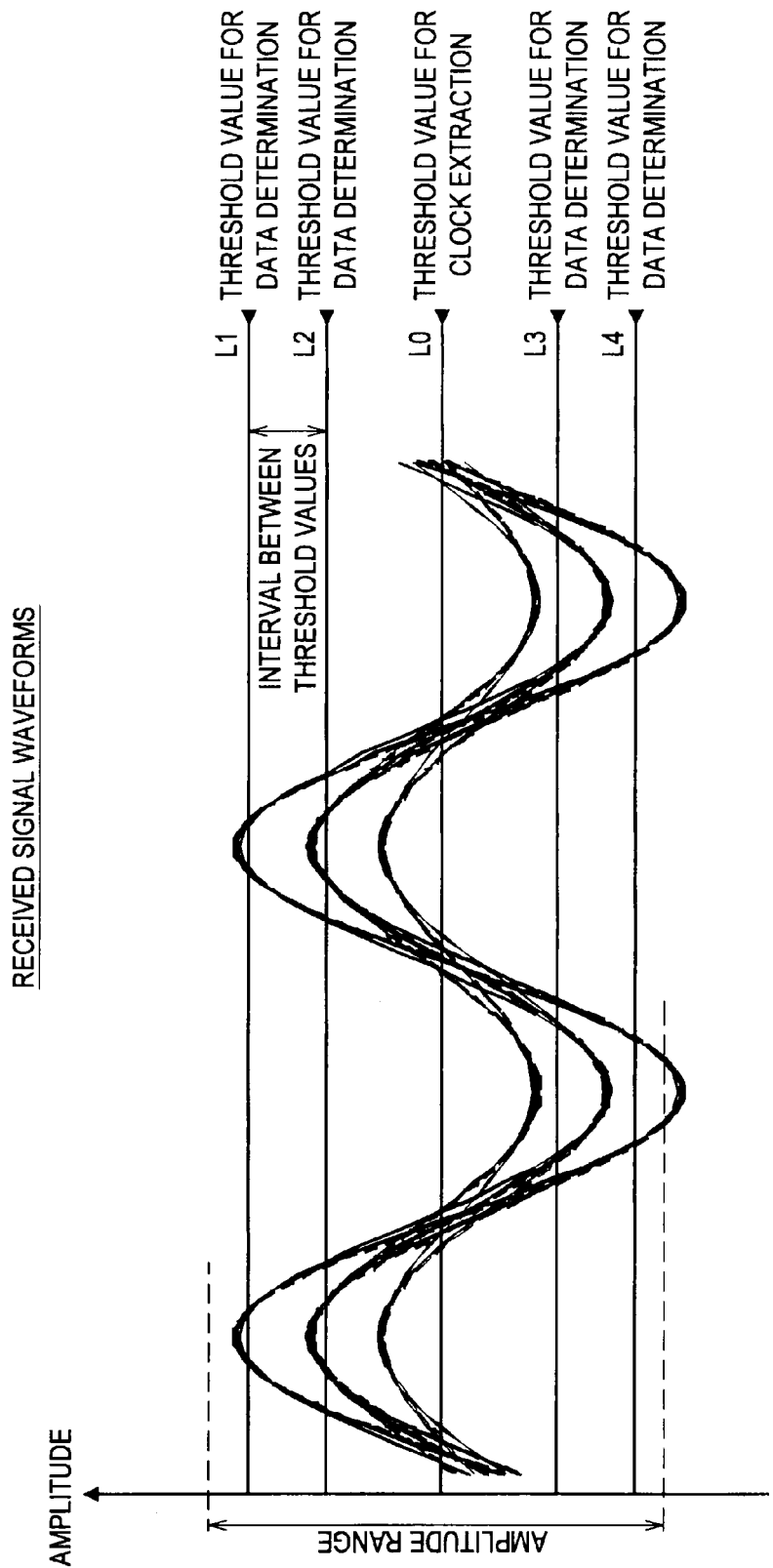
FIG. 7 is an explanatory diagram showing a reception waveform of the signal according to the present embodiment.

For example, the decoder 210 compares the amplitude of the input serial signal and the four threshold values (L1, L2, L3, L4) described above. Moreover, the actual waveform of the serial signal to be input to the decoder 210 will have a round eye-pattern as shown in FIG. 7 due to a high frequency cutoff in the transmission process. Now, the decoder 210 determines whether the amplitude is A1 or A2 based on the comparison result. Furthermore, the decoder 210 restores the original serial signal from the determination result. The determination of the amplitudes A1 and A2 is enabled by flipping the region of a negative amplitude value of the serial signal over to the region of a positive amplitude value by using an absolute value circuit.

The serial signal restored by the decoder 210 in this manner is input to the S/P conversion unit 176. When the serial signal in input from the decoder 210, the S/P conversion unit 176 converts the input serial signal to the parallel signal (parallel display data). The parallel signal that has been converted by the S/P conversion unit 176 is input to the liquid crystal unit 104 (LCD).

On the other hand, the clock detection unit 212 detects the clock component from the serial signal received by the receiver 172. At this time, the clock detection unit 212 detects the cycle of polarity inversion by comparing the amplitude value of the serial signal and the threshold value L0 (potential 0). Furthermore, the clock detection unit 212 detects the clock component based on the detected cycle of polarity inversion, and regenerates the original clock. In this manner, the clock detection unit 212 does not use a PLL circuit when detecting the clock component from the serial signal. Thus power consumption can be reduced since a PLL circuit does not have to be provided on the side of the deserializer 138. Moreover, the clock regenerated by the clock detection unit 212 is input to the decoder 210.

Heretofore, the functional configuration of the mobile terminal 200 according to the present embodiment has been described. As described above, the mobile terminal 200 multiplexes the serial signal and the radio transmission signal with the power signal and transmits the signals, and thus these signals can be transmitted by one coaxial cable 204. As a result, since the number of cables to pass through the connecting unit 106 is only one, the movement range of the connecting unit 106 is enlarged, and the reliability of the signal line is significantly improved. Furthermore, by using a signal with the clock signal superimposed thereon as the transmission signal, it becomes needless to provide a PLL circuit in the display unit 102, and thus the power consumption of the mobile terminal 200 can be reduced.

3. Circuit Configuration of Signal Multiplexing/Separating Section

Figure 8:
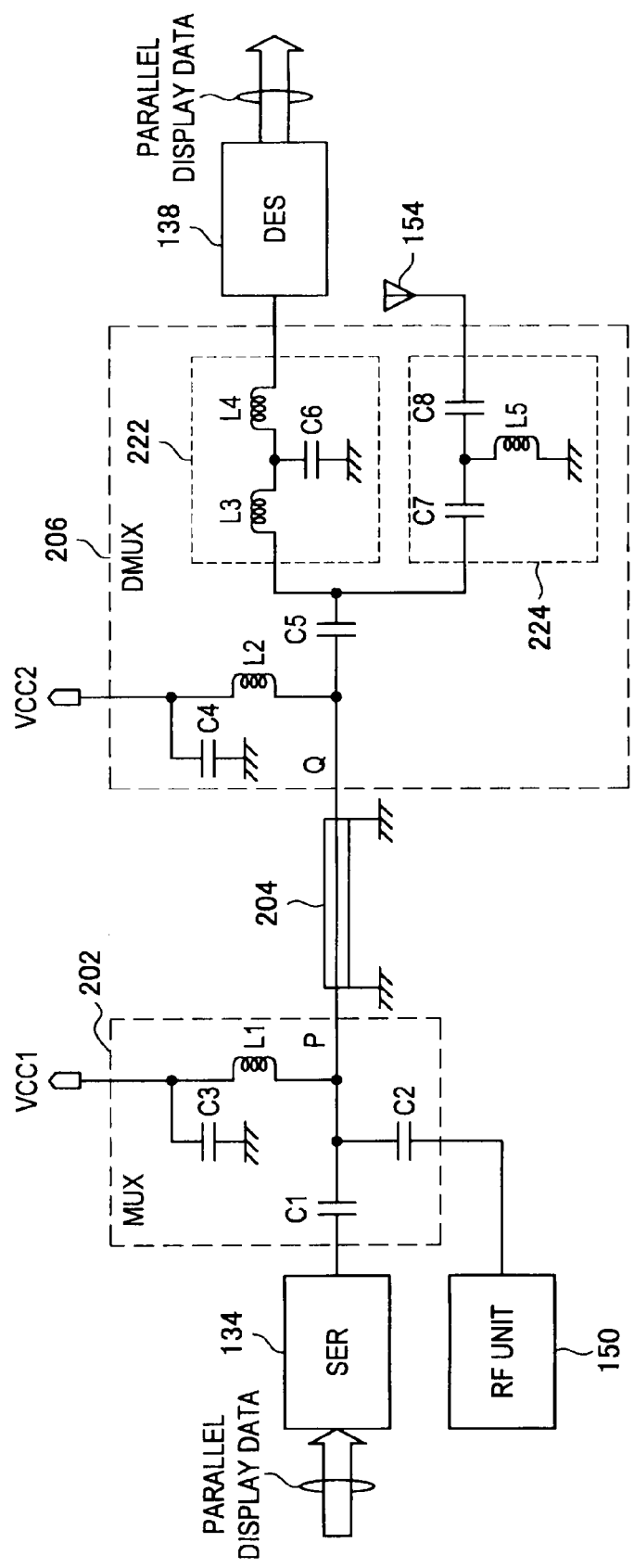
FIG. 8 is an explanatory diagram showing a circuit configuration of a signal multiplexing/separating section according to the present embodiment.

Here, a circuit configuration of a signal multiplexing/separating section (multiplexer 202, demultiplexer 206) provided in the mobile terminal 200 will be described with reference to FIG. 8. FIG. 8 is an explanatory diagram showing a circuit configuration example of the signal multiplexing/separating section according to the present embodiment.

(Multiplexer 202 (MUX))

As shown in FIG. 8, the multiplexer 202 is configured from capacitors C1, C2 and C3, and a choke coil L1.

First, the serial signal output from the serializer 134 is sent to a transmission point P via the capacitor C1. On the other hand, the radio transmission signal of radio frequency output from the RF unit 150 is sent to the transmission point P via the capacitor C2. Furthermore, the power signal input from the DC power source VCC1 is sent to a transmission point P via a low-pass filter formed by the decoupling capacitor C3 and the choke coil L1. Then, the serial signal, the radio transmission signal and the power signal are combined at the transmission point P. Moreover, the capacitor C1 cuts the DC component of the serial signal that passes through. In a similar manner, the capacitor C2 cuts the DC component of the radio transmission signal that passes through. On the other hand, the decoupling capacitor C3 and the choke coil L1 prevent the radio frequency signal from reversing to the DC power supply VCC1.

(Demultiplexer 206 (DMUX))

As shown in FIG. 8, the demultiplexer 206 is configured from capacitors C4, C5, C6, C7 and C8, and choke coils L2, L3, L4 and L5.

The signals multiplexed at the transmission point P reach a transmission point Q in the demultiplexer 206 via the coaxial cable 204. The multiplexed signal at the transmission point Q is in a multiplexed state of the serial signal, the radio transmission signal and the power signal in the frequency domain. First, the multiplexed signal is input to a low-pass filter formed by the decoupling capacitor C4 and the choke coil L2, and the power signal is extracted. The extracted power signal is used as the power supply (VCC2) of the display unit 102.

Furthermore, the multiplexed signal that passed through the capacitor C5 is input to a low-pass filter 222 formed by the choke coils L3 and L4 and the decoupling capacitor C6. In a similar manner, the multiplexed signal that passed through the capacitor C5 is input to a high-pass filter 224 formed by the choke coil L5 and the capacitors C7 and C8. Note that a DC component (corresponding to the power signal) is removed by the capacitor C5 from the multiplexed signal to be input to the low-pass filter 222 and the high-pass filter 224.

Figure 9:
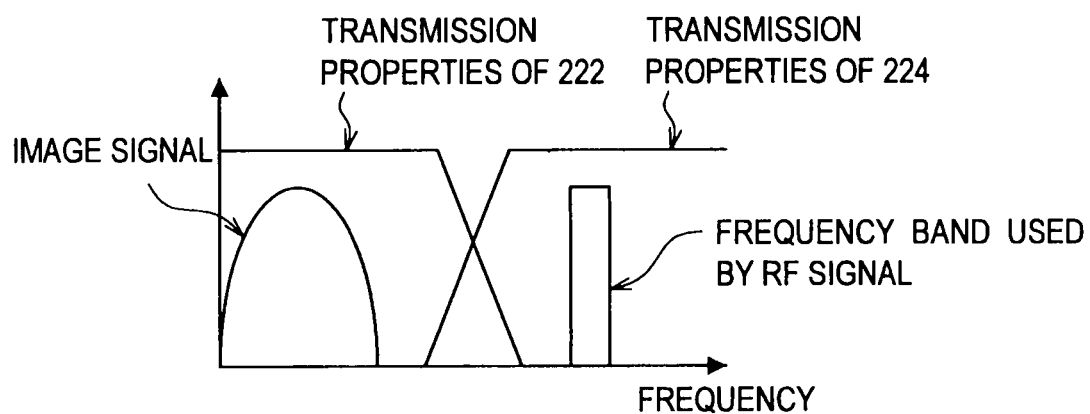
FIG. 9 is an explanatory diagram showing transmission properties of a filter according to the present embodiment.

Here, reference will be made to FIG. 9. FIG. 9 shows the frequency spectrum of the serial signal (image signal) and a frequency band used by the radio transmission signal (RF signal). Furthermore, FIG. 9 shows the transmission properties of the low-pass filter 222 and the high-pass filter 224. As shown in FIG. 9, the low-pass filter 222 has frequency properties of cutting the frequency band of the radio transmission signal and letting the frequency band of the serial signal pass. On the other hand, the high-pass filter 224 has frequency properties of letting the frequency band of the radio transmission signal pass and cutting the frequency band of the serial signal. Therefore, the signal that passed through the low-pass filter 222 does not contain the signal component of the radio transmission signal. In a similar manner, the signal that passed through the high-pass filter 224 does not contain the signal component of the serial signal. That is, the serial signal and the radio transmission signal are separated by the low-pass filter 222 and the high-pass filter 224.

Reference will be made again to FIG. 8. The signal that passed through the low-pass filter 222 is input to the deserializer 138, and is restored to the original parallel signal (parallel display data). On the other hand, the signal that passed through the high-pass filter 224 is transmitted to the first antenna 154. Moreover, the transmission rate of the image signal that is serialized is 500 Mbps or less. Also, the radio frequency band used by mobile phones or the like is a frequency band of 800 MHz or more. Accordingly, the image signal and the radio transmission signal are comparatively easily separated.

Heretofore, a circuit configuration example of the multiplexing section to be mounted on the mobile terminal 200 according to the present embodiment has been described. By adopting a circuit configuration as described above, signals can be multiplexed/separated in the frequency domain. Moreover, also in case the number of transmission signals to be multiplexed with the power signal is three or more, the multiplexed signal can be separated in a similar manner by providing the demultiplexer 206 with a filter for cutting out the frequency band of the added transmission signal.

4. Application to PC

Figure 10:
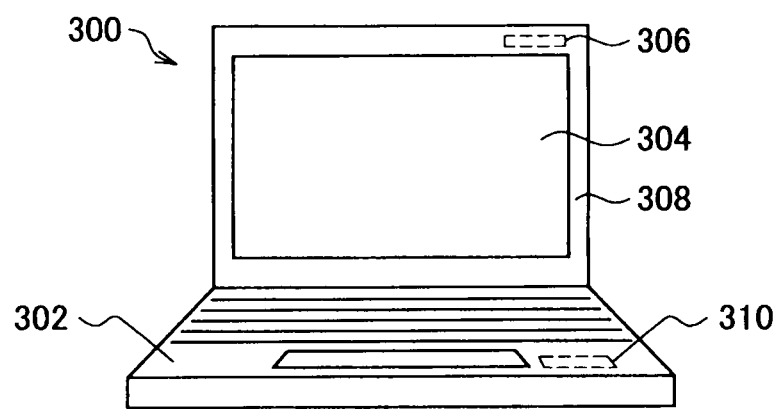
FIG. 10 is an explanatory diagram showing a configuration example of a laptop PC according to the present embodiment.
Figure 11:
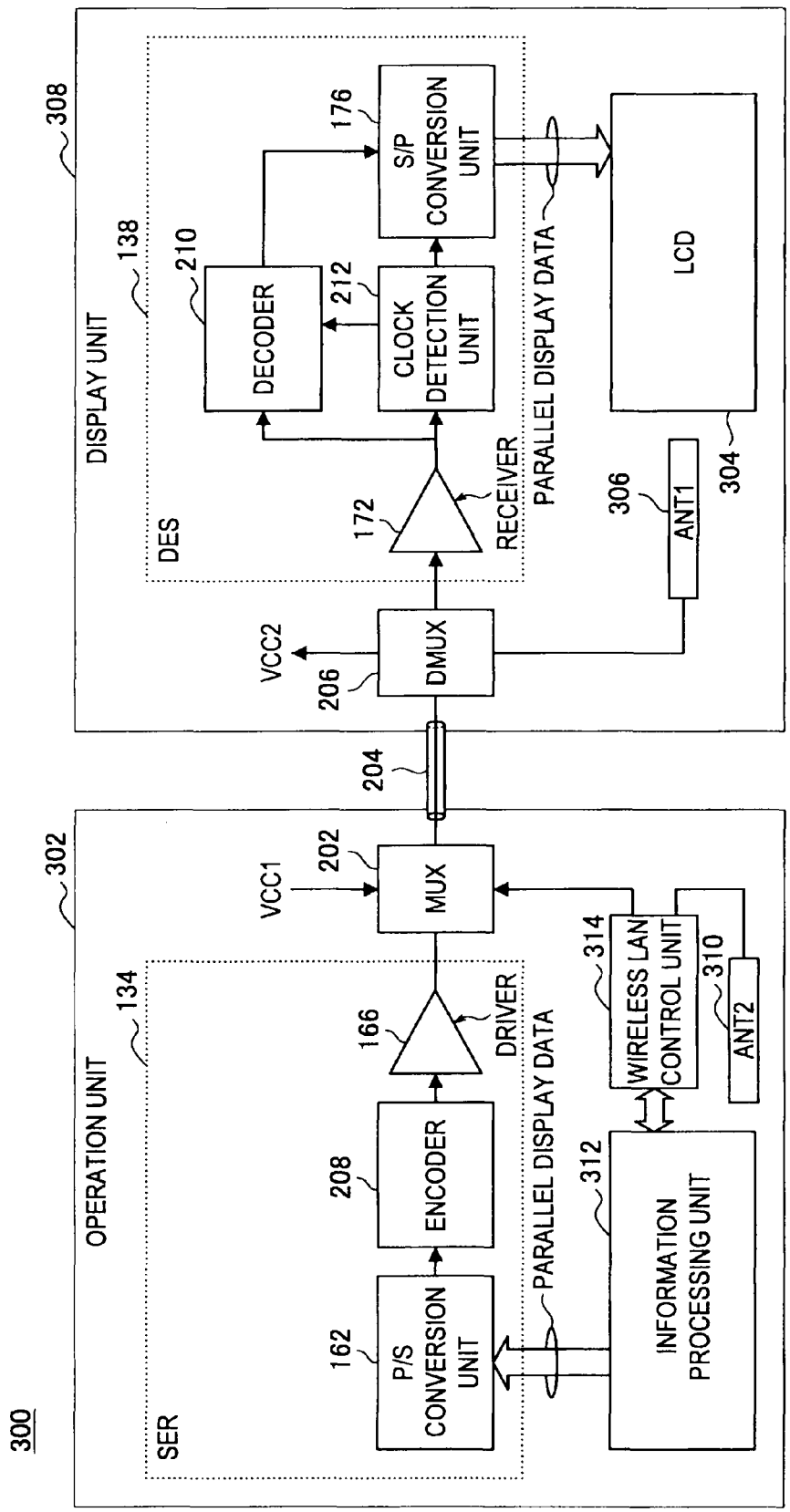
FIG. 11 is an explanatory diagram showing a configuration example of the laptop PC according to the present embodiment.

Next, a method of applying the configuration of the mobile terminal 200 to a laptop personal computer (hereinafter, "laptop PC") will be described with reference to FIGS. 10 and 11. FIG. 10 is an explanatory diagram showing an external appearance of a laptop PC 300 according to the present embodiment. FIG. 11 is an explanatory diagram showing an internal configuration of the laptop PC 300 according to the present embodiment.

First, as shown in FIG. 10, the laptop PC 300 is configured, as with the mobile terminal 200 described above, from an operation unit 302 and a display unit 308. Furthermore, the display unit 308 is provided with a liquid crystal unit 304 and a first antenna 306. Furthermore, the operation unit 302 is provided with a second antenna 310. As shown in FIG. 11, the second antenna 310 is connected to a wireless LAN control unit 314. Furthermore, the wireless LAN control unit 314 is connected to the multiplexer 202 and an information processing unit 312. As described, the main differences between the mobile terminal 200 described above and the laptop PC 300 lie in the external appearances and the functional configurations of the information processing unit 312 and the wireless LAN control unit 314.

The information processing unit 312 is configured from a central processing unit (CPU) or the like, and performs execution processing of a computer program and various arithmetic processings. Furthermore, the arithmetic result of the information processing unit 312 is input to the serializer 134 or the wireless LAN control unit 314. For example, when image display data is output from the information processing unit 312, the image display data is input to the serializer 134 in the form of parallel display data. The image display data input to the serializer 134 is serialized and is input to the multiplexer 202. For example, when a radio frequency signal to be transmitted over a wireless LAN is output from the wireless LAN control unit 314, the radio frequency signal is also input to the multiplexer 202. Furthermore, a power signal is input to the multiplexer 202 from a battery mounted on the operation unit 302.

The multiplexer 202 multiplexes the parallel signal of the image display data input from the information processing unit 312 via the serializer 134, the radio frequency signal of the wireless LAN output from the wireless LAN control unit 312, and the power signal, and generates a multiplexed signal. The multiplexed signal is transmitted to the display unit 308 through one coaxial cable 204. In the display unit 308, the multiplexed signal transmitted through the coaxial cable 204 is input to the demultiplexer 206. The demultiplexer 206 separates, in the frequency domain, the serial signal, the radio frequency signal and the power signal in the multiplexed signal that is input. The power signal separated by the demultiplexer 206 is used as driving power for the display unit 308. Furthermore, the radio frequency signal is wirelessly transmitted via the first antenna 306. Furthermore, the serial signal is converted to the parallel display data by the deserializer 138, and is input to the liquid crystal unit 304.

Heretofore, a case of applying the signal transmission method according to the present embodiment to a PC has been described. In the description, a method has been described, as an example, of multiplexing the image display data, the radio frequency signal of the wireless LAN and the DC current, and supplying the same to the display unit 308 from the operation unit 302. However, the technical scope of the present embodiment is not limited thereto. For example, audio data, a one-segment terrestrial digital broadcast signal or the like may be multiplexed with the power signal and transmitted from the display unit 308 to the operation unit 302 or from the operation unit 302 to the display unit 308. By adopting such a signal transmission method, a plurality of signals can be transmitted by using one coaxial cable 204, and the movement range of the connecting portion between the operation unit 302 and the display unit 308 can be enlarged. For example, the display unit 308 can be configured to rotate 360 degrees in relation to the operation unit 302 on the axis of one coaxial cable 204. Furthermore, the stress on the coaxial cable 204 can be minimized, and thus the reliability of the coaxial cable 204 can be significantly improved.

Heretofore, the signal transmission method according to the present embodiment, and a device (mobile terminal 200, laptop PC 300) adopting the method have been described. As described above, by applying the technology according to the present embodiment, a plurality of transmission signals can be superimposed on the DC current and be transmitted by using one coaxial cable 204. Furthermore, since a clock signal is superimposed on each transmission signal, the receiving side can regenerate the clock without using a PLL. As a result, power consumption can be reduced since a PLL does not have to be used. Such an advantage is of great importance to an electronic device such as a mobile phone. Of course, remarkable advantages can be achieved when the technology according to the present embodiment is applied to, besides a mobile phone, a portable game machine, an imaging device, a laptop PC, an electronic dictionary, a printer, a facsimile, and any other intelligent home appliance. Particularly, the technology according to the present embodiment is suitable for an electronic device that includes a movable portion and for which power supply and data transmission are to be performed between at least two structural members connected by the movable portion.

5. Conclusion

Lastly, the functional configuration of the information processing apparatus (e.g., mobile terminal 200, laptop PC 300) according to the present embodiment, and the advantages achieved by the functional configuration will be briefly summarized.

First, the functional configuration of the information processing apparatus according to the present embodiment can be expressed as follows. The information processing apparatus includes a signal multiplexing unit as described below, one signal cable, and a signal separating unit. The signal multiplexing unit multiplexes a plurality of transmission signals, each in a different frequency band and not containing a DC component, and a power signal supplied from a DC power supply, and generates a multiplexed signal.

As described, each of the transmission signals to be multiplexed by the signal multiplexing unit belongs to a different frequency band. Thus, even when a plurality of transmission signals are multiplexed, each of the transmission signals can be separated easily in the frequency domain. Here, only a plurality of transmission signals belonging to different frequency bands may be input to the signal multiplexing unit, or a plurality of signals may be modulated to be in different frequency bands before being input to the signal multiplexing unit. Furthermore, each of the transmission signals does not contain a DC component. Thus, even when each of the transmission signals is multiplexed with a DC power signal, the power signal and each of the transmission signals may be easily separated in the frequency domain.

Furthermore, the signal cable described above is a cable through which the multiplexed signal generated by the signal multiplexing unit is transmitted. As described above, since a plurality of transmission signals and the power signal are multiplexed by the signal multiplexing unit, it becomes possible to transmit all the signals by one signal cable. Since the number of the signal cables is one, even if a movable member is used for a portion where the signal cable is to be wired, the risk of the signal cable breaking or being damaged due to the transformation of the movable portion is significantly low. Furthermore, a transformation of the movable member such as rotation by 360 degrees on the axis of the signal cable is enabled. Thus the structure of the information processing apparatus can be designed to use a movable member with a high degree of freedom of transformation, and the degree of freedom of design is greatly increased. As a result, a structure is made possible which allows the shape of the information processing apparatus to change into a shape that is easy for a user to use depending on the use situation such as viewing television, capturing images, talking, or inputting data.

Furthermore, the signal separating unit described above is for separating the multiplexed signal transmitted through the signal cable into signals, each in a frequency band of one of the transmission signals, and a signal in a frequency band of the power signal. As described above, the plurality of transmission signals belong to mutually different frequency bands. Furthermore, each of the transmission signals does not contain a DC component. Thus, if the DC component is extracted from the multiplexed signal, the power signal is separated; and if a component in the frequency band of each of the transmission signals is extracted from the multiplexed signal, each of the transmission signals is separated. In this manner, the multiplexed signal generated by the signal multiplexing unit described above can be easily separated in the frequency domain by the signal separating unit. As described above, by combining the signal multiplexing unit and the signal separating unit, a multiplexed transmission using one signal cable is realized. As a result, the advantages as described above can be achieved, and the usability for a user can be greatly improved.

The information processing apparatus described above will be described more concretely as follows. The information processing apparatus includes first and second information processing modules connected to each other by the signal cable. The first information processing module includes the DC power supply, the signal multiplexing unit, and a signal processing unit for performing a predetermined processing on the transmission signal. The second information processing module includes a display screen for outputting an image signal, a radio antenna, and the signal separating unit. In this case, the signal multiplexing unit multiplexes, with the power signal, the image signal to be output on the display screen and a radio signal transmitted from the radio antenna as the transmission signals, and generates a multiplexed signal. Furthermore, the signal separating unit separates the image signal, the radio signal and the power signal in the multiplexed signal.

Normally, with an information processing apparatus divided into two information processing modules, a power supply is mounted on one of the information processing modules. Thus power is supplied to one of the information processing modules to the other information processing module. That is, a power signal is inevitably transmitted between the two information processing modules. Also, if a display screen is mounted on one of the information processing modules, an image signal is transmitted between the two information processing modules. A signal line for a power signal and a signal line for an image signal are already required at this stage.

Furthermore, a radio communication/calling section is mounted on a mobile phone as a matter of course. Similarly, a wireless communication section for wireless LAN or the like is mounted on an electronic device such as a laptop PC. As is well known, a radio communication antenna is easily screened by a human body. Thus, in many information processing apparatuses, the radio communication antenna is provided in a position away from the portion to be operated by the user. In such a case, a radio signal has to be transmitted between the two information processing modules. A signal line for a power signal, a signal line for an image signal and a signal line for a radio signal are required at this stage. However, with the information processing apparatus described above, these signals are transmitted, being multiplexed in the frequency domain, so that the signals can be transmitted by one signal cable. Moreover, the power signal is a direct current, the transmission rate of the image signal is approximately 500 Mbps or less, and the frequency band of the radio signal is a frequency band of approximately 800 MHz or more. Therefore, the central portions of the frequency bands of the signals are distant from each other, and the signals are easily separated in the frequency domain and thus they are suitable for the multiplexed transmission scheme described above. Of course, the multiplexed transmission scheme is also applicable to other types of signals having similar characteristics.

Furthermore, the signal separating unit described above will be described in more detail as follows. The signal separating unit includes a first filter having a frequency band near a frequency 0 as a passband, and a plurality of second filters respectively having the frequency band of one of the plurality of transmission signals as a passband. In this case, the power signal is extracted from the multiplexed signal by the first filter. Also, each of the transmission signals is extracted from the multiplexed signal from which the power signal is removed, by each of the second filters. In this manner, the power signal and each of the transmission signals are successively extracted in the frequency domain from the multiplexed signal by using a plurality of filters.

Furthermore, the information processing apparatus may be a laptop personal computer or a mobile phone. In addition, the information processing apparatus may be any of various electronic devices such as a portable game machine or an imaging device. Furthermore, the signal multiplexing unit may be configured to multiplex, with the power signal, at least a transmission/reception signal in a wireless local area network (LAN) or a reception signal of a broadcast wave as the transmission signal.

Furthermore, the signal multiplexing unit may be configured to multiplex the plurality of transmission signals with the power signal, the plurality of transmission signals being encoded by taking input data that includes mutually different first and second bit values and expressing the first bit value in the form of a plurality of first amplitude values and the second bit value in the form of second amplitude values different from the first amplitude values such that a same amplitude value does not occur consecutively and a polarity of the amplitude value is inverted with each cycle. By using a transmission signal encoded by such an encoding scheme, the receiving side is enabled to regenerate a clock without using a PLL. That is, a polarity inversion cycle of the amplitude value is detected on the receiving side and the clock is regenerated based on the polarity inversion cycle. As a result, a PLL does not have to be provided, and thus power consumption can be reduced. Furthermore, since a PLL is not provided, the circuit scale can be made small, and thus the manufacturing cost can be reduced.

(Remarks)

The multiplexer 202 described above is an example of the signal multiplexing unit. The coaxial cable 204 described above is an example of the signal cable. The demultiplexer 206 described above is an example of the signal separating unit. The operation unit 108 described above is an example of the first information processing module. The serializer 134 and the RF unit 150 described above are examples of the signal processing unit. The display unit 102 described above is an example of the second information processing module. The liquid crystal unit 104 described above is an example of the display screen. The first antenna 154 described above is an example of the radio antenna. The serial signal of the parallel display data described above is an example of the image signal. The combination of the choke coil L2 and the decoupling capacitor C4 described above is an example of the first filter. The combination of the choke coils L3, L4 and the decoupling capacitor C6 (low-pass filter 222) described above is an example of the second filter. Furthermore, the combination of the choke coil L5 and the capacitors C7, C8 (high-pass filter 224) described above is also an example of the second filter.

It should be understood by those skilled in the art that various modifications, combinations, sub-combinations and alterations may occur depending on design requirements and other factors insofar as they are within the scope of the appended claims or the equivalents thereof.

For example, in the embodiment described above, a method of generating a transmission signal by superimposing a clock on an AMI code has been described, and a scheme of multiplexing the transmission signal with a power signal and transmitting the same has been described as an example. However, the technology according to the present embodiment can also be applied to a scheme of multiplexing an AMI code or a Manchester code, neither containing a DC component, with a power signal and transmitting the same. However, it is more preferable to use the encoding scheme described in the embodiment described above. Furthermore, in the embodiment described above, although only a case of transmitting the radio transmission signal from the RF unit 150 has been described, the same can also be said for a case of receiving the radio transmission signal from the RF unit 150 via an antenna.

The present application contains subject matter related to that disclosed in Japanese Priority Patent Application JP 2008-260254 filed in the Japan Patent Office on 7 Oct. 2008, the entire content of which is hereby incorporated by reference.

What is claimed is:

1. An information processing apparatus comprising: circuitry configured to multiplex a plurality of transmission signals, each in a different frequency band and not containing a DC component, and a power signal supplied from a DC power supply, and generating a multiplexed signal; and a signal cable through which the multiplexed signal, which includes the plurality of transmission signals and the power supply signal as a single, complex signal, is transmitted, wherein the circuitry is further configured to:

separate the multiplexed signal transmitted through the signal cable into signals, each in a frequency band of one of the plurality of transmission signals, and a signal in a frequency band of the power signal;

multiplex the plurality of transmission signals with the power signal, the plurality of transmission signals obtained by encoding input data that includes mutually different first and second bit values by expressing the first bit value in a form of a plurality of first amplitude values and the second bit value in a form of second amplitude values different from the first amplitude values such that a same amplitude value does not occur consecutively and a polarity of the amplitude value is inverted with each cycle, wherein the first bit value has a data value of one that is expressed by at least three different values of the plurality of first amplitude values and the second bit value has a data value of zero that is expressed by two different values of the second amplitude values; and compare amplitude values of the multiplexed signal with a plurality of threshold values to determine whether the plurality of first amplitude values correspond to the data value of one or the second amplitude values correspond to the data value of zero.

2. The information processing apparatus according to claim 1, wherein the circuitry includes first and second information processing modules connected to each other by the signal cable;

the first information processing module has the DC power supply, signal multiplexing circuitry, and a signal processor for performing a predetermined processing on the transmission signal;

the second information processing module has a display screen for outputting an image signal, a radio antenna, and signal separating circuitry;

the signal multiplexing circuitry is configured to multiplex, with the power signal, the image signal to be output on the display screen and a radio signal transmitted from the radio antenna as the transmission signals, and generates a multiplexed signal; and the signal separating circuitry is configured to separate the image signal, the radio signal and the power signal in the multiplexed signal.

3. The information processing apparatus according to claim 1, wherein the circuitry includes:

a first filter having a frequency band near a frequency 0 as a passband, and a plurality of second filters each having the frequency band of one of the plurality of transmission signals as a passband; and the power signal is extracted from the multiplexed signal by the first filter; and each of the plurality of transmission signals is extracted from the multiplexed signal from which the power signal is removed, by each of the plurality of second filters.

4. The information processing apparatus according to claim 1, wherein the information processing apparatus is a laptop personal computer or a mobile phone.

5. The information processing apparatus according to claim 1, wherein
the circuitry is further configured to multiplex, with the power signal, at least a transmission/reception signal in a wireless local area network (LAN) or a reception signal of a broadcast wave as the transmission signal.

6. The information processing apparatus according to claim 5, wherein the single, complex signal, includes the transmission/reception signal in the wireless local area network (LAN) or the reception signal of the broadcast wave.

7. The information processing apparatus according to claim 5, wherein the circuitry includes first and second information processing modules connected to each other only by the signal cable.

8. The information processing apparatus according to claim 1, wherein the circuitry includes first and second information processing modules connected to each other only by the signal cable.

9. The information processing apparatus according to claim 1, further comprising:
an operation circuit including signal multiplexing circuitry; and
a display circuit including signal separating circuitry, wherein the operation circuit and the display circuit are connected to each other only by the signal cable.

10. The information processing apparatus according to claim 1, further comprising:
an operation circuit including signal multiplexing circuitry; and
a display circuit including signal separating circuitry, wherein the operation circuit and the display circuit are electrically connected to each other only by the signal cable.

11. The information processing apparatus according to claim 1, wherein the circuitry is further configured to regenerate an original clock by detecting a clock component based upon the polarity inversion.

12. The information processing apparatus according to claim 11, wherein the circuitry is further configured to not use a PLL circuit when detecting the clock component.

13. The information processing apparatus according to claim 1, wherein
the data value of one is represented by 4 different non-zero values.

14. The information processing apparatus according to claim 1, wherein
the data value of one is represented by values 1, −1, 3, and −3; and
the data value of zero is represented by values 2, and −2.

15. A signal transmission method comprising the steps of:
multiplexing a plurality of transmission signals, each in a different frequency band and not containing a DC component, and a power signal supplied from a DC power supply, and generating a multiplexed signal, wherein multiplexing the plurality of transmission signals includes multiplexing the plurality of transmission signals with the power signal, the plurality of transmission signals obtained by encoding input data that includes mutually different first and second bit values by expressing the first bit value in a form of a plurality of first amplitude values and the second bit value in a form of second amplitude values different from the first amplitude values such that a same amplitude value does not occur, and a polarity of the amplitude value is inverted with each cycle, wherein the first bit value has a data value of one that is expressed by at least three different values of the plurality of first amplitude values and the second bit value has a data value of zero that is expressed by two different values of the second amplitude values;
transmitting the multiplexed signal, which includes the plurality of transmission signals and the power supply signal as a single, complex signal, generated in the step of multiplexing a plurality of transmission signals through a signal cable;
separating the multiplexed signal transmitted through the signal cable into signals, each in a frequency band of one of the plurality of transmission signals, and a signal in a frequency band of the power signal; and
comparing amplitude values of the multiplexed signal with a plurality of threshold values to determine whether the plurality of first amplitude values correspond to the data value of one or the second amplitude values correspond to the data value of zero.

16. A non-transitory medium storing instructions which when executed cause a computer to perform a method, the method comprising:
multiplexing a plurality of transmission signals, each in a different frequency band and not containing a DC component, and a power signal supplied from a DC power supply, and generating a multiplexed signal, wherein multiplexing the plurality of transmission signals includes multiplexing the plurality of transmission signals with the power signal, the plurality of transmission signals obtained by encoding input data that includes mutually different first and second bit values by expressing the first bit value in a form of a plurality of first amplitude values and the second bit value in a form of second amplitude values different from the first amplitude values such that a same amplitude value does not occur, and a polarity of the amplitude value is inverted with each cycle, wherein the first bit value has a data value of one that is expressed by at least three different values of the plurality of first amplitude values and the second bit value has a data value of zero that is expressed by two different values of the second amplitude values;
transmitting the multiplexed signal, which includes the plurality of transmission signals and the power supply signal as a single, complex signal, generated in the step of multiplexing a plurality of transmission signals through a signal cable;
separating the multiplexed signal transmitted through the signal cable into signals, each in a frequency band of one of the plurality of transmission signals, and a signal in a frequency band of the power signal; and
comparing amplitude values of the multiplexed signal with a plurality of threshold values to determine whether the plurality of first amplitude values correspond to the data value of one or the second amplitude values correspond to the data value of zero.

* * * * *